United States Patent
Morimura (10) Patent No.: US 12,187,079 B2
(45) Date of Patent: Jan. 7, 2025

(54) MOTORCYCLE TIRE

(71) Applicant: Sumitomo Rubber Industries, Ltd., Kobe (JP)

(72) Inventor: Ryosuke Morimura, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 18/105,002

(22) Filed: Feb. 2, 2023

(65) Prior Publication Data

US 2023/0294458 A1 Sep. 21, 2023

(30) Foreign Application Priority Data

Mar. 15, 2022 (JP) ................. 2022-040580

(51) Int. Cl.
*B60C 11/13* (2006.01)
*B60C 11/03* (2006.01)

(52) U.S. Cl.
CPC ...... *B60C 11/1392* (2013.01); *B60C 11/0302* (2013.01); *B60C 11/032* (2013.01); (Continued)

(58) Field of Classification Search
CPC ............... B60C 2200/10; B60C 11/032; B60C 2011/0374; B60C 2011/0381; (Continued)

(56) References Cited

U.S. PATENT DOCUMENTS

2005/0115653 A1* 6/2005 Miyasaka ............. B60C 11/033
152/209.1
2010/0147427 A1* 6/2010 Ishiyama ............ B60C 11/0302
152/209.16
(Continued)

FOREIGN PATENT DOCUMENTS

CN 102066135 A 5/2011
CN 102774243 A 11/2012
(Continued)

OTHER PUBLICATIONS

Extended European Search Report for European Application No. 23160106.3, dated Jul. 12, 2023.

*Primary Examiner* — Cedrick S Williams
*Assistant Examiner* — Thomas Frank Schneider
(74) *Attorney, Agent, or Firm* — Birch, Stewart, Kolasch & Birch, LLP (57) ABSTRACT

A motorcycle tire has a tread portion. The tread portion has a ground contact surface curved in an arc shape convex outward in a tire radial direction. The ground contact surface includes a central region and a first outer region. The ground contact surface has oblique grooves each including a portion inclined with respect to a tire circumferential direction. Each of the oblique grooves extends across the central region and the first outer region. Each of the oblique grooves includes a vertical groove portion extending at an angle α of 20 degrees or less with respect to the tire circumferential direction. A minimum distance in a tire axial direction along the ground contact surface between the vertical groove portion and an outer edge of the central region is 30% or less of a maximum width in the tire axial direction of the central region along the ground contact surface.

17 Claims, 7 Drawing Sheets (52) U.S. Cl.
CPC .............. *B60C 2011/0376* (2013.01); *B60C 2011/0381* (2013.01); *B60C 2200/10* (2013.01)

(58) Field of Classification Search
CPC ..... B60C 2011/0376; B60C 2011/0379; B60C 11/0302; B60C 11/0304; B60C 11/03; B60C 11/0318; B60C 11/1392
See application file for complete search history.

(56) References Cited

U.S. PATENT DOCUMENTS

| | | | |
|---|---|---|---|
| 2011/0162769 A1 | 7/2011 | Mariani et al. | |
| 2011/0253276 A1* | 10/2011 | Misani | B60C 11/0302 152/209.1 |
| 2012/0255660 A1* | 10/2012 | Nakagawa | B60C 11/1323 152/209.11 |
| 2014/0230978 A1 | 8/2014 | Misani et al. | |

FOREIGN PATENT DOCUMENTS

| | | | | |
|---|---|---|---|---|
| CN | 105172478 A | | 12/2015 | |
| CN | 206242819 U | * | 6/2017 | |
| EP | 3237233 B1 | * | 11/2017 | ......... B60C 11/0302 |
| EP | 3 095 621 B1 | | 5/2018 | |
| JP | 3-135802 A | | 6/1991 | |
| JP | H03135802 | * | 6/1991 | |
| JP | H0655909 A | * | 3/1994 | |
| JP | 2015-502279 A | | 1/2015 | |
| JP | 2020-125087 A | | 8/2020 | |
| WO | WO-2017051280 A1 | * | 3/2017 | ......... B60C 11/0083 |

* cited by examiner

MOTORCYCLE TIRE

RELATED APPLICATIONS

This application claims the benefit of foreign priority to Japanese Patent Applications No. JP2022-040580, filed Mar. 15, 2022, which are incorporated by reference in its entirety.

FIELD OF THE INVENTION

The present disclosure relates to a motorcycle tire.

BACKGROUND OF THE INVENTION

A motorcycle tire with a plurality of oblique grooves in a tread portion is proposed in Japanese Unexamined Patent Application Publication No. 2020-125087. This motorcycle tire is expected to maintain wet performance and improve transient characteristics during cornering by specifying angles of the oblique grooves.

SUMMARY OF THE INVENTION

In recent years, there has been a demand for improvement in fuel efficiency of motorcycles. In addition, electric motorcycles, which are becoming popular in recent years, are expected to increase their driving range on a single charge. In order to meet these needs, a reduction in rolling resistance of motorcycle tires is required.

The present disclosure was made in view of the above, and a primary object thereof is to provide a motorcycle tire with reduced rolling resistance.

The present disclosure is a motorcycle tire including a tread portion, wherein the tread portion includes a first tread edge, a second tread edge, and a ground contact surface defined between the first tread edge and the second tread edge, the ground contact surface is curved in an arc shape so as to be convex outward in a tire radial direction, the ground contact surface includes a central region and a first outer region, the central region is configured to contact a ground during straight running with zero camber angle, and includes a first outer edge in a tire axial direction located on the first tread edge side and a second outer edge in the tire axial direction located on the second tread edge side, the first outer region is defined on the first tread edge side of the first outer edge of the central region, the ground contact surface is provided with a plurality of oblique grooves each including a portion inclined with respect to a tire circumferential direction, each of the oblique grooves extends across the central region and the first outer region, each of the oblique grooves includes a vertical groove portion extending at an angle α of 20 degrees or less with respect to the tire circumferential direction, and a minimum distance in the tire axial direction along the ground contact surface between the vertical groove portion and the first outer edge of the central region is 30% or less of a maximum width in the tire axial direction of the central region along the ground contact surface.

It is possible that the motorcycle tire of the present disclosure reduces the rolling resistance by adopting the above configuration.

DETAILED DESCRIPTION OF THE INVENTION

Figure 1:
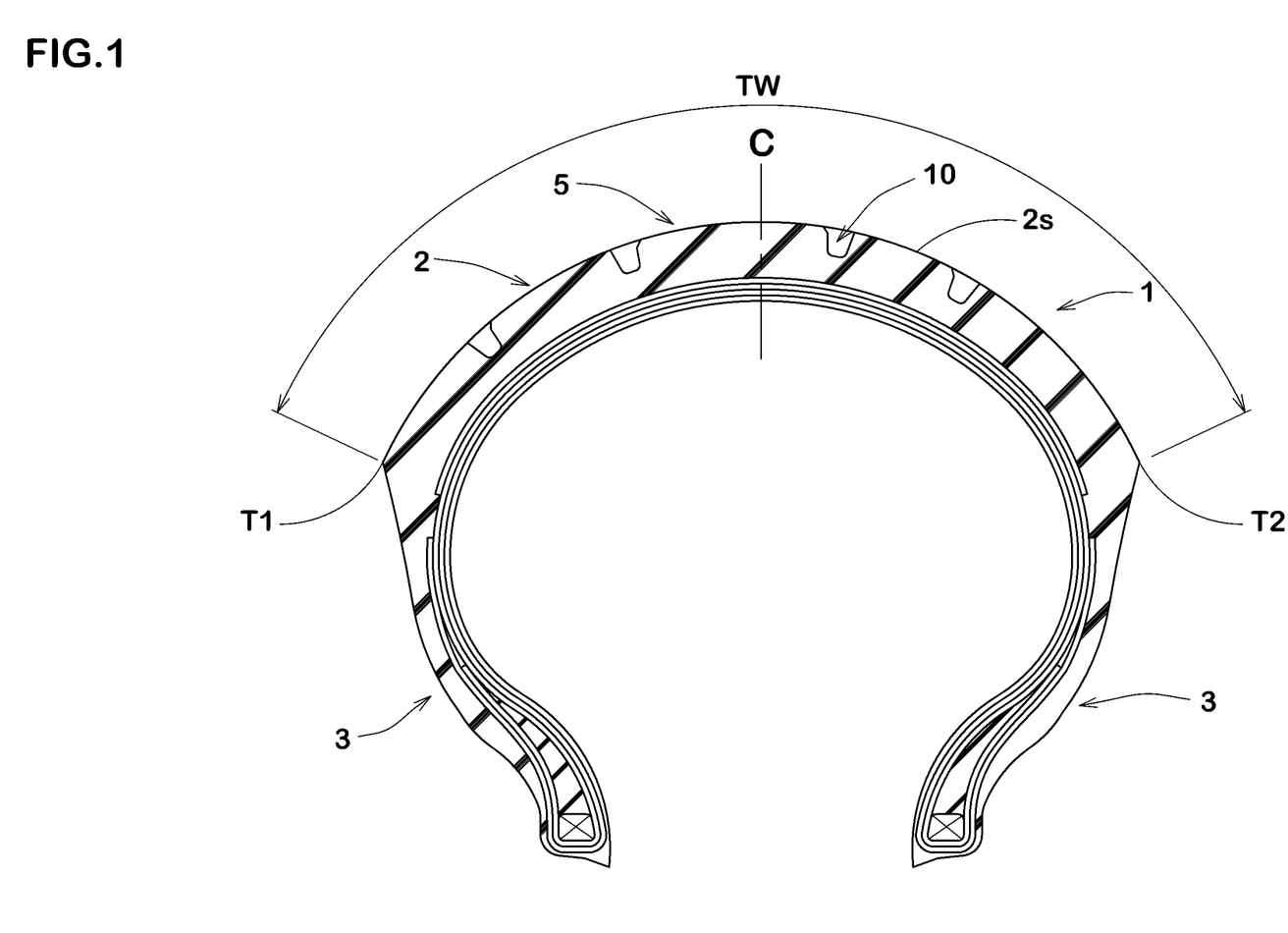
FIG. 1 is a lateral cross-sectional view of a motorcycle tire according to an embodiment of the present disclosure.
Figure 2:
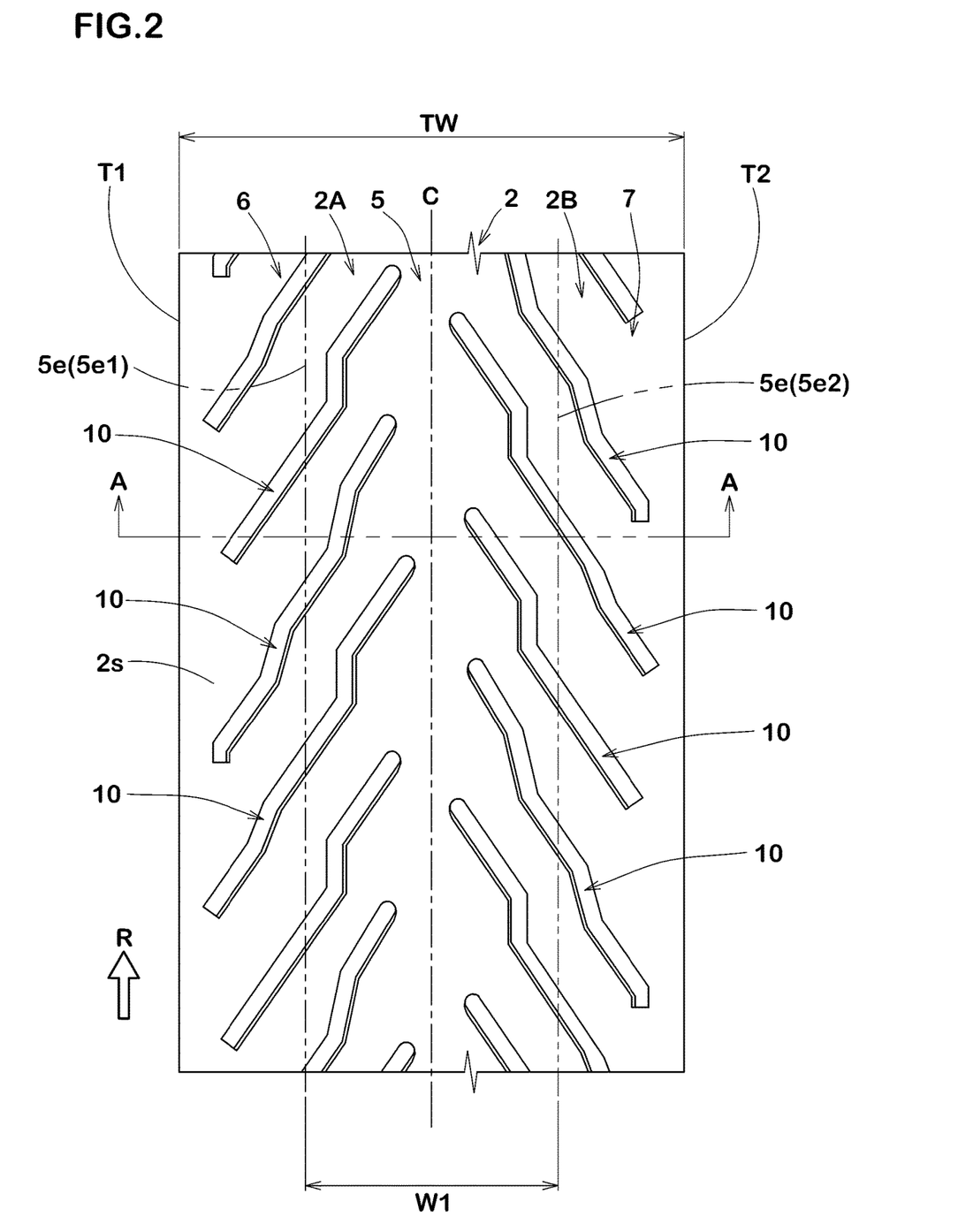
FIG. 2 is a development view a tread portion of FIG. 1.

An embodiment of the present disclosure will now be described in conjunction with accompanying drawings. FIG. 1 shows a lateral cross-sectional view of a motorcycle tire 1 (hereinafter may simply be referred to as "tire") according to an embodiment of the present disclosure in a standard state. FIG. 2 is a development view showing a tread pattern of a tread portion 2 of the tire 1. FIG. 1 is an A-A cross sectional view of FIG. 2. The tire 1 of the present embodiment is suitable for scooters, for example.

The term "standard state" refers to a state in which the tire 1 is mounted on a standard rim, inflated to a standard inner pressure, and loaded with no tire load. In the case of tires for which various standards have not been established, the aforementioned standard state means the state of standard use of the tire for its intended purpose, unmounted on the vehicle and loaded with no tire load. In the present specification, unless otherwise noted, the dimensions and the like of various parts of the tire are the values measured in the standard state. Further, in the present specification, unless otherwise noted, known methods can be applied as appropriate to measure the dimensions.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 in the present embodiment includes a first tread edge T1, a second tread edge T2, and a ground contact surface (2s) therebetween. The first tread edge T1 and the second tread edge T2 correspond to the edges of the ground contact surface (2s) and contact the road surface when cornering at the maximum camber angle. Further, the ground contact surface (2s) is curved in an arc shape so as to be convex outward in a tire radial direction. The tire 1 configured as such can obtain sufficient ground contact area even during cornering with a large camber angle.

The tire 1 of the present embodiment has internal components provided in a general motorcycle, such as a carcass, a belt layer, and the like. Known configurations may be employed as appropriate for these.

As shown in FIG. 2, the tread portion 2 has a directional pattern in which a rotational direction (R) is specified. The rotational direction (R) is indicated by letters or symbols on sidewall portions 3 (shown in FIG. 1), for example.

As shown in FIGS. 1 and 2, the ground contact surface (2s) includes a central region 5 configured to contact a ground during straight running with zero camber angle. The central region 5 means a region that contacts a plane when the tread portion 2 of the tire 1 in the standard state is in contact with the plane with zero camber angle by being loaded with 100% of a standard tire load. In FIG. 2, outer edges (5e) of the central region 5 are indicated by a chain double-dashed line. The outer edges (5e) are a first outer edge (5e1) positioned on the first tread edge T1 side and a second outer edge (5e2) positioned on the second tread edge T2 side.

As shown in FIG. 2, a maximum width W1 of the central region 5 is appropriately adjusted according to various configurations such as curvature of the ground contact surface (2s) of the tread portion 2, the carcass, the belt layer, and the like. The maximum width W1 of the central region 5 of the present embodiment is from 40% to 60% of a tread ground contacting width TW, for example. It should be noted that the maximum width W1 is the maximum width in a tire axial direction of the central region 5 along the ground contact surface (2s) in the standard state. The tread ground contacting width TW is the distance along the ground contact surface (2s) from the first tread edge T1 to the second tread edge T2 in the standard state.

As shown in FIG. 2, the tread portion 2 includes a first tread portion 2A defined between the first tread edge T1 and a tire equator (C) and a second tread portion 2B defined between the second tread edge T2 and the tire equator C. In the present embodiment, the first tread portion 2A and the second tread portion 2B have a pattern that is substantially line symmetrical with respect to the tire equator (C), except that they are displaced in a tire circumferential direction of the tire. Therefore, the configuration described in the present specification for the first tread portion 2A can be applied to the second tread portion 2B. However, the present disclosure is not limited to such an aspect, and the pattern of the tread portion 2 may be asymmetric with respect to the tire equator (C).

The ground contact surfaces (2s) include a first outer region 6 and a second outer region 7. The first outer region 6 is a region on the first tread edge T1 side of the first outer edge (5e1) of the central region 5. The second outer region 7 is a region on the second tread edge T2 side of the second outer edge (5e2) of the central region 5. Further, the ground contact surface (2s) is provided with a plurality of oblique grooves 10 including portions inclined with respect to the tire circumferential direction. The oblique grooves 10 in the present embodiment are provided in each of the first tread portion 2A and the second tread portion 2B. The features of the present disclosure will be described below based on the oblique grooves 10 provided in the first tread portion 2A.

Figure 3:
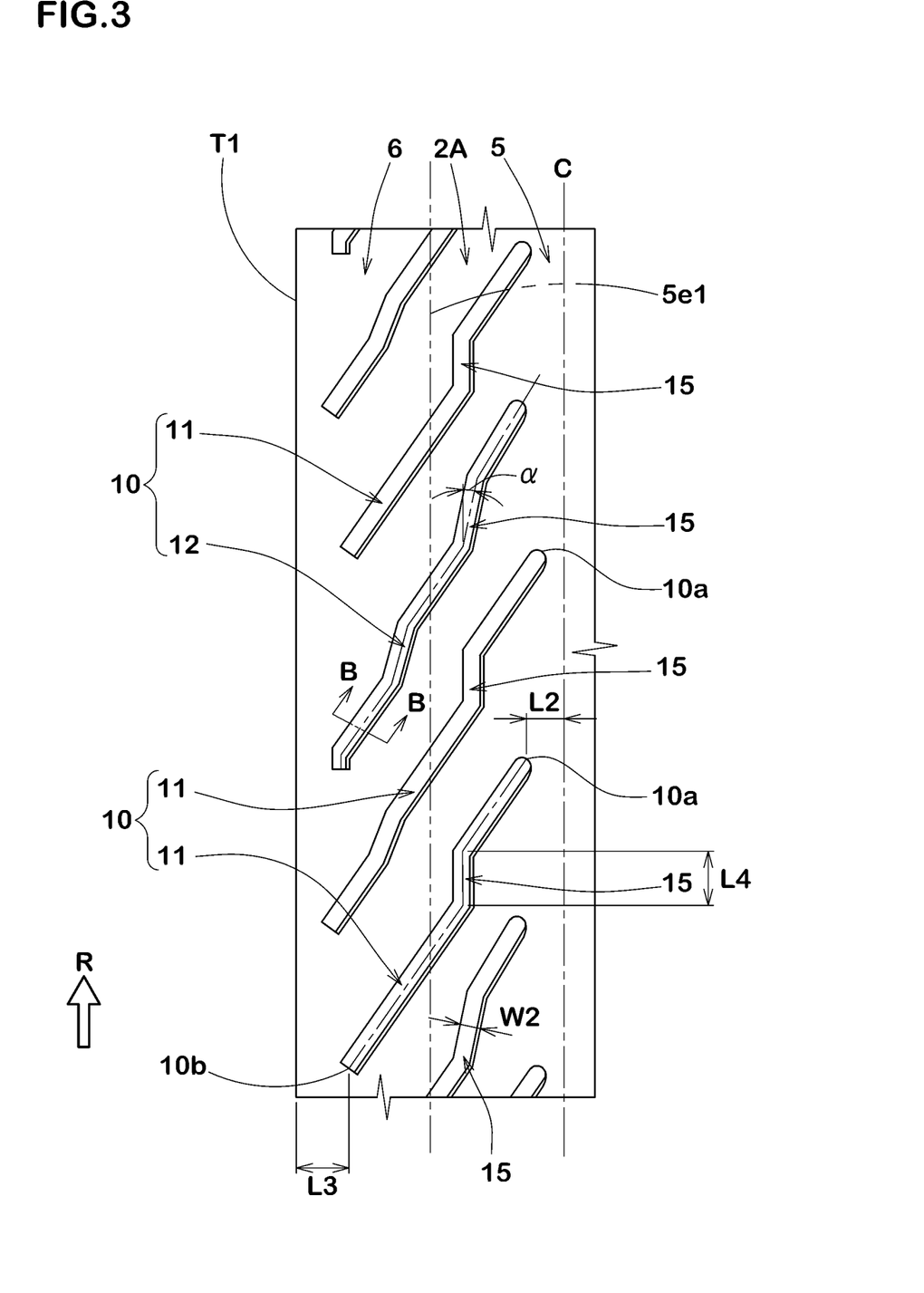
FIG. 3 is an enlarged view of a first tread portion of FIG. 2.

FIG. 3 shows an enlarged view of the first tread portion 2A of FIG. 2. As shown in FIG. 3, each of the oblique grooves 10 extends across the central region 5 and the first outer region 6. Further, each of the oblique grooves 10 includes a vertical groove portion 15 extending at an angle α of 20 degrees or less with respect to the tire circumferential direction.

Figure 4:
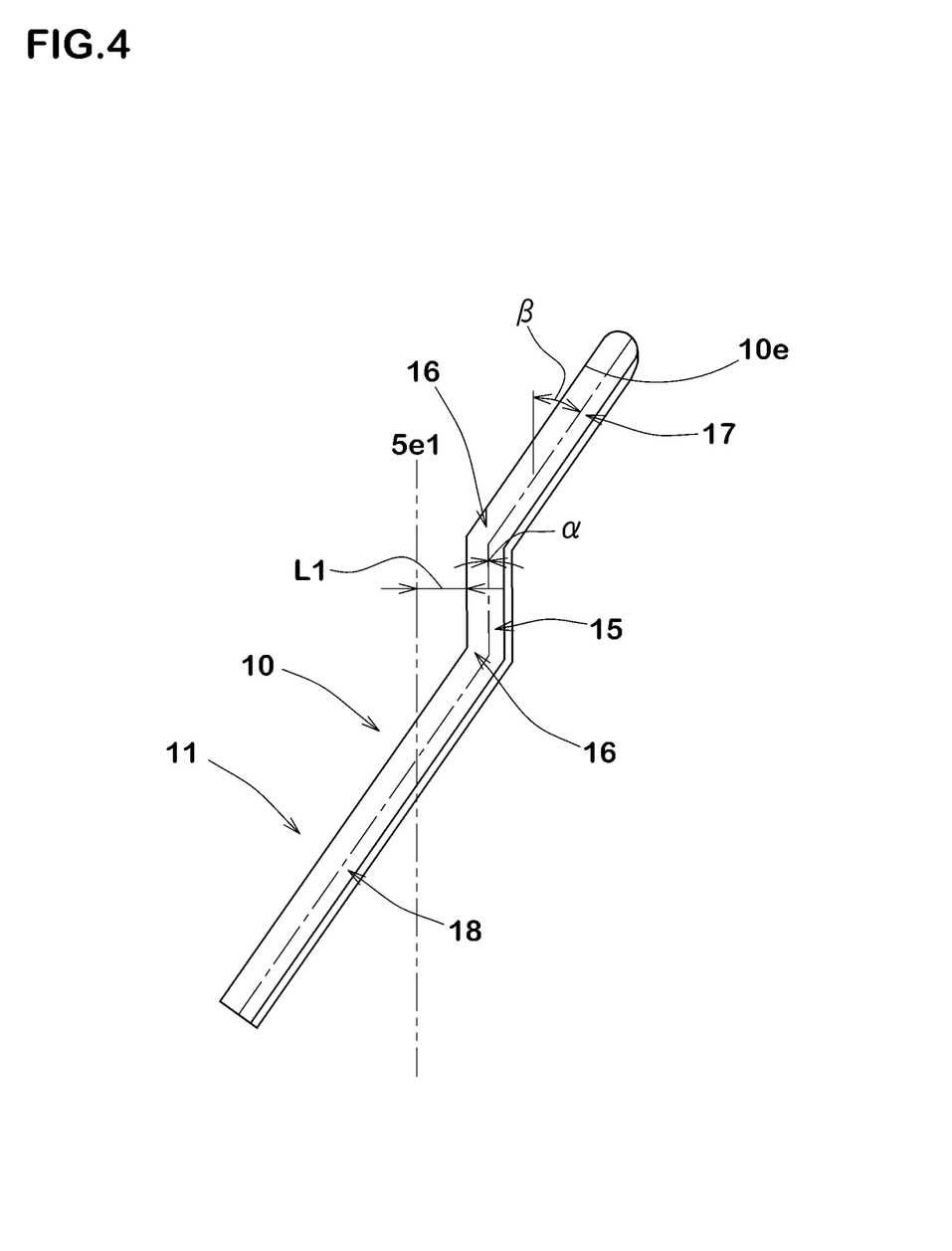
FIG. 4 is an enlarged view of a first oblique groove of FIG. 3.

FIG. 4 shows an enlarged view of one of the oblique grooves 10. As shown in FIG. 4, a minimum distance L1 in the tire axial direction along the ground contact surface (2s) between the vertical groove portion 15 and the first outer edge (5e1) in the first tread portion 2A of the central region 5 is 30% or less of the maximum width W1 (shown in FIG. 2) in the tire axial direction. It should be noted that the minimum distance L1 means the minimum distance from the above-mentioned first outer edge (5e) to the groove edge of the vertical groove portion 15. The tire 1 of the present disclosure can reduce the rolling resistance by adopting the above configuration. The mechanism is as follows.

Motorcycle tires with the ground contact surface (2s) curved in an arc shape have large distortion near the outer edges (5e) of the central region 5 of the tread portion 2 that touches the ground during straight running. This distortion also tends to increase the rolling resistance. In the present disclosure, the vertical groove portions 15 of the oblique grooves 10 are located near the outer edges (5e) of the central region 5, therefore, the strain described above can be alleviated, thereby, the rolling resistance can be reduced. In addition, in the present disclosure, since the rolling resistance can be reduced independent of the rubber composition of the tread portion 2, maintenance of handling performance and anti-wear performance can also be expected.

A more detailed configuration of the present embodiment will be described below. It should be noted that each configuration described below represents a specific aspect of the present embodiment. Therefore, it goes without saying that the present disclosure can achieve the effects described above even if it does not have the configuration described below. Further, even if any one of the configurations described below is applied alone to the tire of the present disclosure having the features described above, an improvement in performance according to each configuration can be expected. Furthermore, when some of the configurations described below are applied in combination, a combined improvement in performance can be expected according to the combination.

As shown in FIG. 3, the oblique grooves 10 are inclined to a toe side in the rotational direction (R) as it goes from the tire equator (C) side to the first tread edge T1 side, for example. As a result, in each of the oblique grooves 10, an inner end (10a) on the tire equator (C) side is positioned on a heel side, which comes into contact with the ground first, in the rotational direction (R), and an outer end (10b) on the first tread edge T1 side is positioned on a toe side, which comes into contact with the ground last, in the rotational direction (R). The oblique grooves 10 configured as such can exert excellent drainage performance by utilizing tire rotation.

The oblique grooves 10 are fit between tire equator (C) and the first tread edge T1. That is, the inner ends (10a) of the oblique grooves 10 are located on the first tread edge T1 side from the tire equator (C). The outer ends (10b) of the oblique grooves 10 are located on the tire equator (C) side from the first tread edge T1. However, the oblique grooves 10 are not limited to such an aspect, and may cross the tire equator (C) or open at the first tread edge T1. It should be noted that the inner end (10a) and the outer end (10b) are the ends of a groove centerline of each of the oblique grooves 10.

A distance L2 in the tire axial direction from the tire equator (C) to the inner end (10a) of each of the oblique grooves 10 is 10% or less of the tread ground contacting width TW. A distance L3 in the tire axial direction from the first tread edge T1 to the outer end (10b) of each of the oblique grooves 10 is 10% or less of the tread ground contacting width TW. The distance L2 and distance L3 mentioned above mean the distances along the ground contact surface (2s). Hereinafter, in the present specification, unless otherwise specified, the distances and lengths of various parts are meant to be along the ground contact surface (2s).

In a preferred embodiment, in at least one pair of the oblique grooves 10 adjacent to each other in the tire circumferential direction, the inner ends (10a) are arranged at different positions in the tire axial direction from each other. Similarly, in at least one pair described above, the outer ends (10b) of the oblique grooves 10 are arranged at different positions in the tire axial direction. The arrangement of the oblique grooves 10 configured as such helps to suppress uneven wear near the tire equator (C) and near the first tread edge T1.

As shown in FIG. 4, each of the oblique grooves 10 includes at least one bent portion 16. Each of the oblique grooves 10 in the present embodiment includes a plurality of the bent portions 16. The bent portions 16 are portions where groove edges (10e) of the oblique grooves 10 are bent. In the present embodiment, of the two groove edges (10e) forming each of the bent portions 16, for the groove edge (10e) with the larger radius of curvature, the radius of curvature is smaller than the groove width of each of the oblique grooves 10.

Each of the vertical groove portion 15 is formed between two bent portions 16. The vertical groove portions 15 of the present embodiment extend linearly. However, they are not limited to such a mode, and the vertical groove portions 15 may extend in a curved manner. It is preferred that a maximum groove width W2 (shown in FIG. 3) of each of the vertical groove portions 15 is 50% or more of the maximum groove width of each of the oblique grooves 10. In the present embodiment, the oblique grooves 10 extend with a substantially constant groove width, and the groove width of each of the vertical groove portions 15 is the same as the groove width of the other portions of the oblique grooves 10. The vertical groove portions 15 configured as such utilize the rotation of the tire to provide excellent drainage performance and help to improve the wet performance.

As shown in FIG. 3, in each of the oblique grooves 10, each of the vertical groove portions 15 has a length L4 of 10% or more and 20% or less of a total length of the oblique groove 10. The vertical groove portions 15 configured as such can decrease the rolling resistance while maintaining the cornering performance. The total lengths of the oblique grooves 10 and the lengths L4 of the vertical groove portions 15 each mean a so-called periphery length along the groove centerline. The same applies to the lengths of various parts described below.

The vertical groove portions 15 may be disposed on the tire equator (C) side of the first outer edge (5e1) of the central region 5, on the first tread edge T1 side of the first outer edge (5e1), or on the first outer edge (5e1) as long as the minimum distance L1 is in the above range. As a preferred aspect, the vertical groove portions 15 of the present embodiment are located on the tire equator (C) side of the first outer edge (5e1). It is preferred that the minimum distance L1 (shown in FIG. 4) between each of the vertical groove portions 15 and the first outer edge (5e1) is 15% or less of the maximum width W1 of the central region 5. As a result, the above-described effects are reliably exerted.

As shown in FIG. 3, in the present embodiment, in at least one pair of the oblique grooves 10 adjacent to each other in the tire circumferential direction among the plurality of the oblique grooves 10, it is preferred that the vertical groove portions 15 are arranged at different positions from each other in the tire axial direction. As a result, the transient characteristics of the response when leaning over the vehicle become linear (hereinafter this action may be referred to as "improving the transient characteristics"), and excellent cornering performance is obtained.

The oblique grooves 10 include first oblique grooves 11 and second oblique grooves 12 having different angles of the vertical groove portion 15. The angle α of the vertical groove portion 15 of each of the first oblique grooves 11 is less than 5 degrees. The angle α of the vertical groove portion 15 of each of the second oblique grooves 12 is 5 degrees or more. As a result, pitch sounds generated by the oblique grooves 10 are turned into white noise, therefore, noise performance can be improved. It should be noted that the oblique groove 10 shown in FIG. 4 is the first oblique groove 11.

It is preferred that the number of the first oblique grooves 11 is greater than the number of the second oblique grooves 12 over the entire circumference of the tire. As a result, the effect of reducing the rolling resistance is reliably exerted while improving the noise performance.

As shown in FIG. 4, each of the oblique grooves 10 includes an inner groove portion 17. The inner groove portion 17 is arranged axially inside the vertical groove portion 15 in each of the oblique grooves 10. The inner groove portion 17 of the present embodiment is continuous with the vertical groove portion 15 via one of the bent portions 16 and extends linearly while being inclined with respect to the tire circumferential direction. It is preferred that a maximum angle β of the inner groove portion 17 with respect to the tire circumferential direction is larger than the angle α of the vertical groove portion 15. Specifically, the angle β is from 30 to 45 degrees. The inner groove portions 17 configured as such can provide drainage capacity while maintaining rigidity in the tire axial direction of the central region 5.

It is preferred that the inner groove portion 17 has a length greater than the length L4 of the vertical groove portion 15 (shown in FIG. 3). Specifically, in each of the oblique grooves 10, the length of the inner groove portion 17 is from 20% to 50% of a total length of the oblique groove 10. The inner groove portions 17 configured as such helps to improve steering stability and the wet performance in a good balance.

Each of the oblique grooves 10 includes an outer groove portion 18. The outer groove portion 18 is positioned axially outside the vertical groove portion 15 in each of the oblique grooves 10. In the oblique groove 10 shown in FIG. 4, the outer groove portion 18 extends linearly over a length thereof. The outer groove portion 18 has a length greater than the length L4 of the vertical groove portion 15 (shown in FIG. 3). In each of the oblique grooves 10, the length of the outer groove portion 18 is from 40% to 60% of the total length of the oblique groove 10. The outer groove portions 18 configured as such can improve the wet performance during cornering.

Figure 5:
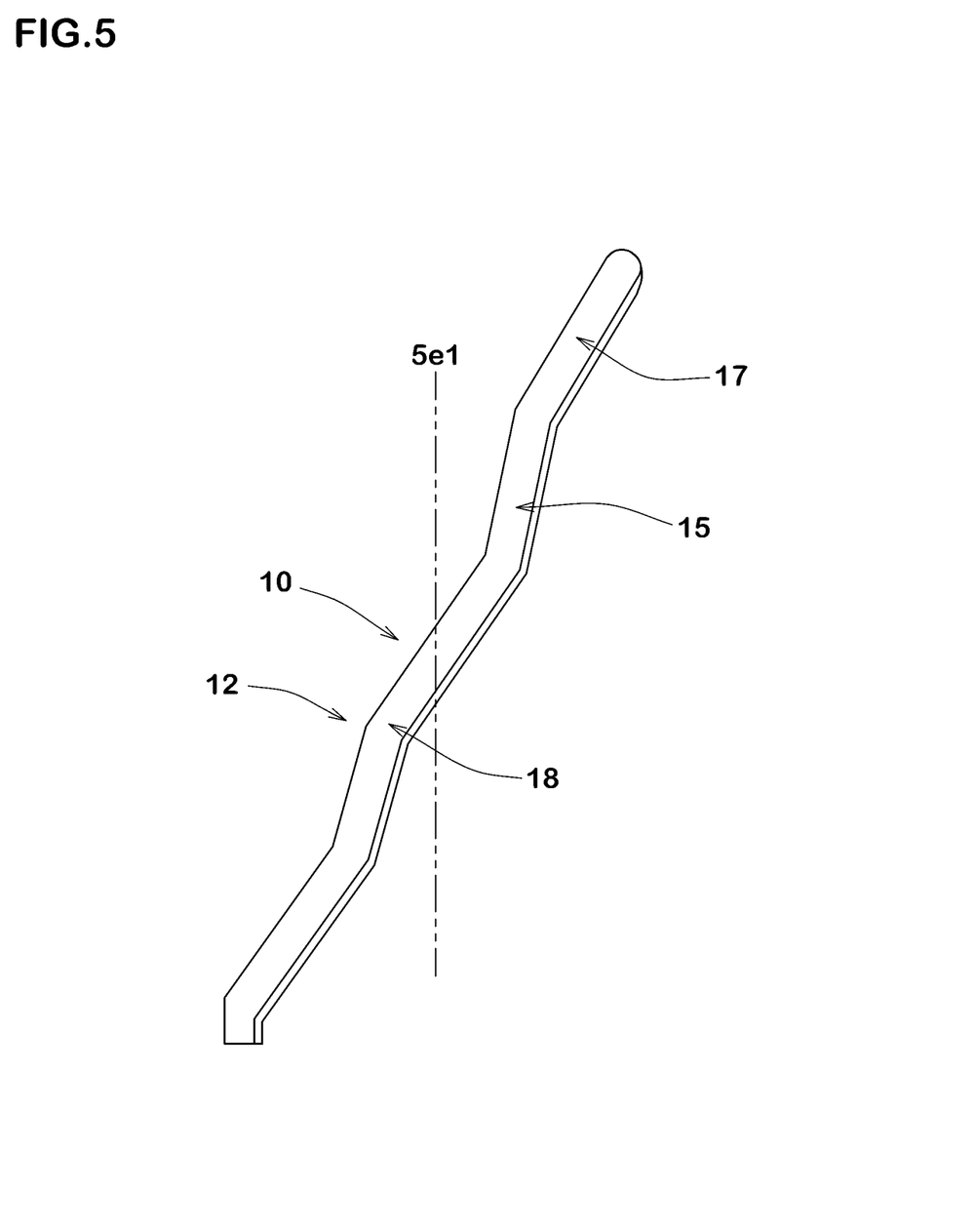
FIG. 5 is an enlarged view of a second oblique groove of FIG. 3.

FIG. 5 shows an enlarged view of one of the oblique grooves 10 which is different from the one shown in FIG. 4. The oblique groove 10 shown in FIG. 5 is the second oblique groove 12. As shown in FIG. 5, each of the outer groove portions 18 is not limited to one extending linearly, but may extend in a zigzag shape, for example. The outer groove portions 18 configured as such can provide frictional force in multiple directions by groove edges thereof, therefore, the transient characteristics during cornering can be improved.

As shown in FIG. 3, the tread portion 2 of the present embodiment is provided with a plurality of the oblique grooves 10 with the outer groove portions 18 extending linearly, and a plurality of the oblique grooves 10 with the outer groove portions 18 extending in a zigzag shape. The arrangement of the oblique grooves 10 configured as such helps to improve the transient characteristics during cornering and the wet performance in a good balance.

Figure 6:
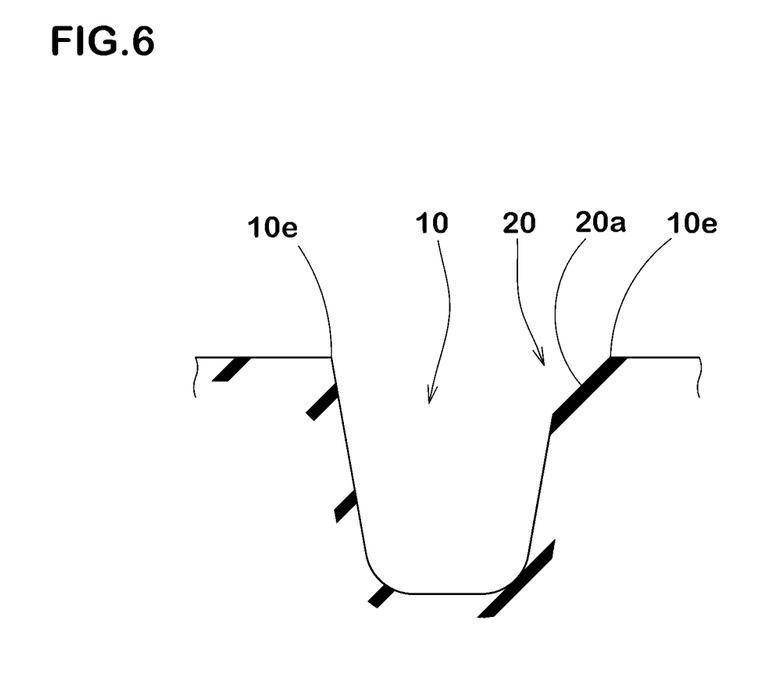
FIG. 6 is a B-B cross sectional view of FIG. 3.

FIG. 6 shows a B-B cross sectional view of FIG. 3. As shown in FIG. 6, each of the oblique grooves 10 has a pair of the groove edges (10e). Further, of the pair of the groove edges (10e) of each of the oblique grooves 10, a chamfered portion 20 is formed on the groove edge (10e) on the toe side in the rotational direction (R). The chamfered portion 20 includes a sloping surface (20a) extending obliquely between one of groove walls of the oblique groove 10 and the ground contact surface. On the other hand, the groove edge (10e) on the heel side in the rotational direction (R) is not provided with a chamfered portion. As a result, excessive deformation of the land pieces divided by the oblique grooves 10 is suppressed, thereby, the rolling resistance is further decreased.

As shown in FIG. 2, the tread portion 2 of the present embodiment has a land ratio from 70% to 85%, for example. The tread portion 2 configured as such helps to improve the wet performance and the anti-wear performance in a good balance. It should be noted the land ratio is the ratio of the area of the actual ground contact surface (2s) to the area of the virtual ground contact surface in which all the grooves provided in the tread portion 2 are filled.

While detailed description has been made of the motorcycle tire according to an embodiment of the present disclosure, the present disclosure can be embodied in various forms without being limited to the illustrated embodiment.

EXAMPLES

Figure 7:
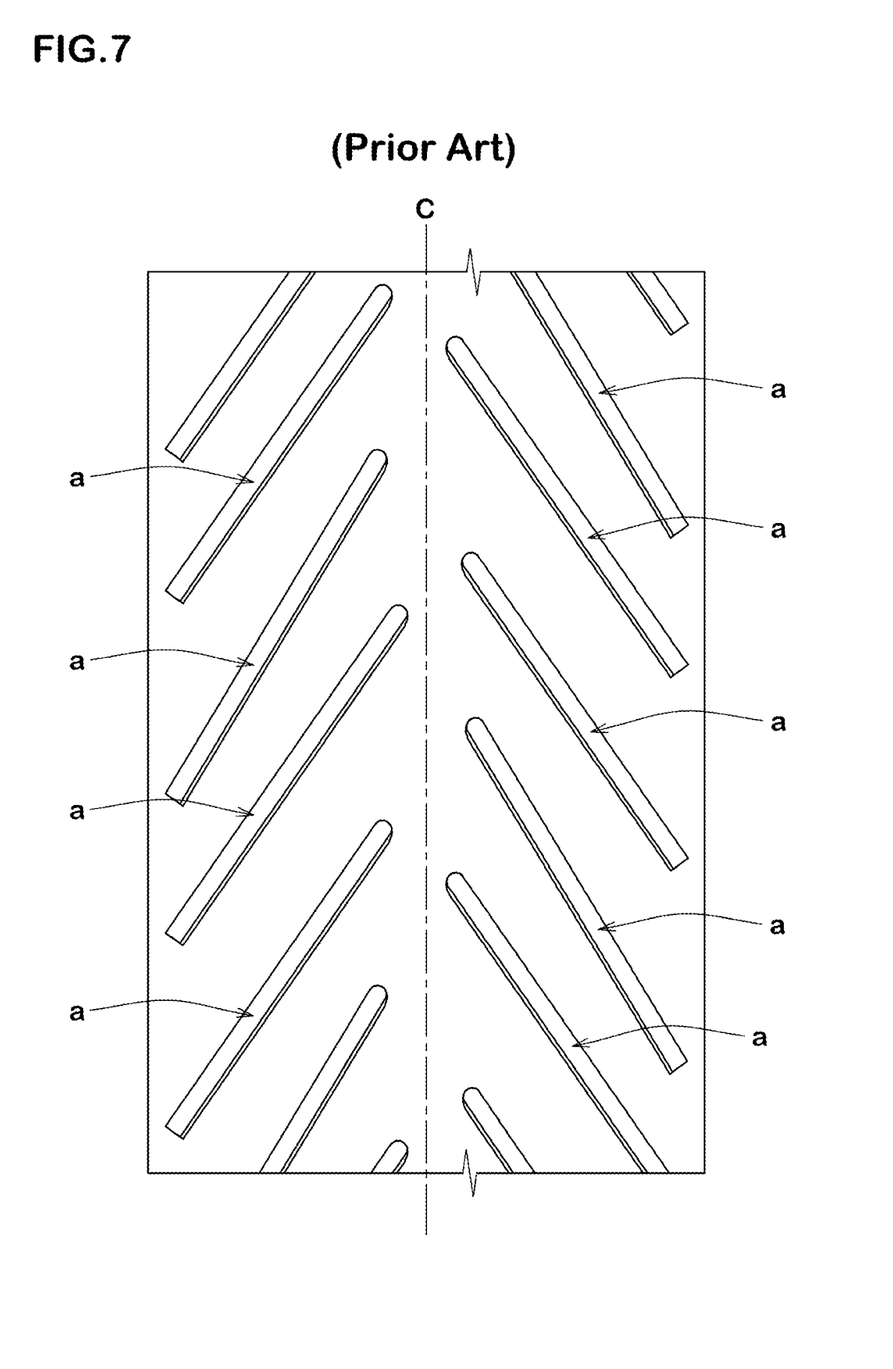
FIG. 7 is a development view of a tread portion of a motorcycle tire in Reference.

Motorcycle tires of size 120/70-14 having the basic structure of FIG. 1 and the tread pattern of FIG. 2 were made by way of test. Further, as a Reference, motorcycle tires having the basic structure shown in FIG. 1 and the tread pattern shown in FIG. 7 were made by way of test. As shown in FIG. 7, the tread portion of the tires in the Reference are provided with a plurality of oblique grooves (a) without vertical groove portions. The rolling resistance was measured for these tires. The mounting rim, the inner pressure, and the measurement methods are as follows.

Mounting rim: MT3.5×14
Inner pressure: 225 kPa
<Rolling Resistance>

The tires in the Reference and Examples were run on a rolling resistance tester under the following conditions, and their rolling resistance was measured. The results are indicated by an index based on the rolling resistance of the Reference being 100, wherein the larger the numerical value, the smaller the rolling resistance is, which is better.

Longitudinal load: 1.3 kN
Speed: 30 to 60 km/h
The test results are shown in Table 1.

TABLE 1

| | Reference | Example 1 | Example 2 | Example 3 |
|---|---|---|---|---|
| Distance L1 between Vertical groove portion and First outer edge of Central region/Maximum width W1 of Central region [%] | — | 5 | 10 | 20 |
| Rolling resistance [index] | 100 | 90 | 95 | 98 |

From the test results, it was confirmed that the rolling resistance was reduced for the motorcycle tires in the Examples

[Statement of Disclosure]

The present disclosure includes the following aspects.

[Present Disclosure 1]

A motorcycle tire comprising a tread portion, wherein the tread portion includes a first tread edge, a second tread edge, and a ground contact surface defined between the first tread edge and the second tread edge, the ground contact surface is curved in an arc shape so as to be convex outward in a tire radial direction, the ground contact surface includes a central region and a first outer region, the central region is configured to contact a ground during straight running with zero camber angle, and includes a first outer edge in a tire axial direction located on the first tread edge side and a second outer edge in the tire axial direction located on the second tread edge side, the first outer region is defined on the first tread edge side of the first outer edge of the central region, the ground contact surface is provided with a plurality of oblique grooves each including a portion inclined with respect to a tire circumferential direction, each of the oblique grooves extends across the central region and the first outer region, each of the oblique grooves includes a vertical groove portion extending at an angle $\alpha$ of 20 degrees or less with respect to the tire circumferential direction, and a minimum distance in the tire axial direction along the ground contact surface between the vertical groove portion and the first outer edge of the central region is 30% or less of a maximum width in the tire axial direction of the central region along the ground contact surface.

[Present Disclosure 2]

The motorcycle tire according to claim 1, wherein each of the oblique grooves includes at least one bent portion.

[Present Disclosure 3]

The motorcycle tire according to claim 1, wherein each of the oblique grooves includes a plurality of bent portions.

[Present Disclosure 4]

The motorcycle tire according to claim 1, wherein the vertical groove portion extends linearly.

[Present Disclosure 5]

The motorcycle tire according to claim 1, wherein
each of the oblique grooves includes an inner groove portion arranged axially inside the vertical groove portion, and the inner groove portion has a maximum angle $\beta$ larger than the angle $\alpha$ of the vertical groove portion with respect to the tire circumferential direction.

[Present Disclosure 6]

The motorcycle tire according to claim 5, wherein the inner groove portion extends linearly.

[Present Disclosure 7]

The motorcycle tire according to claim 5, wherein the inner groove portion has a length of 20% or more and 50% or less of a total length of the each of the oblique grooves.

[Present Disclosure 8]

The motorcycle tire according to claim 1, wherein
the oblique grooves include first oblique grooves, and
the angle $\alpha$ of the vertical groove portion of each of the first oblique grooves is less than 5 degrees.

[Present Disclosure 9]

The motorcycle tire according to claim 1, wherein
the oblique grooves include second oblique grooves, and
the angle $\alpha$ of the vertical groove portion of each of the second oblique grooves is 5 degrees or more.

[Present Disclosure 10]

The motorcycle tire according to claim 1, wherein the vertical groove portions are arranged at different positions from each other in the tire axial direction in a pair of the oblique grooves adjacent to each other in the tire circumferential direction among the plurality of the oblique grooves.

[Present Disclosure 11]

The motorcycle tire according to claim 1, wherein a maximum groove width (W2) of the vertical groove portion is 50% or more of a maximum groove width of the each of the oblique grooves.

[Present Disclosure 12]

The motorcycle tire according to claim 1, wherein
each of the oblique grooves includes an outer groove portion arranged axially outside the vertical groove portion, and
the outer groove portion extends linearly.

[Present Disclosure 13]

The motorcycle tire according to claim 1, wherein
each of the oblique grooves includes an outer groove portion arranged axially outside the vertical groove portion, and
the outer groove portion extends in a zigzag shape.

[Present Disclosure 14]

The motorcycle tire according to claim 1, wherein
the motorcycle tire is bound with an intended tire rotational direction,
each of the oblique grooves includes a pair of groove edges, and
in the pair of the groove edges, the groove edge on a toe side in the tire rotational direction is formed with a chamfered portion.

DESCRIPTION OF REFERENCE SIGNS 2 tread portion
T1 first tread edge
T2 second tread edge
2s ground contact surface
5 central region
5e outer edge
5e1 first outer edge
6 first outer region
10 oblique grooves
15 vertical groove portion

The invention claimed is:

1. A motorcycle tire comprising a tread portion, wherein
the tread portion includes a first tread edge, a second tread edge, and a ground contact surface defined between the first tread edge and the second tread edge,
the ground contact surface is curved in an arc shape so as to be convex outward in a tire radial direction,
the ground contact surface includes a central region and a first outer region,
the central region is configured to contact a ground during straight running with zero camber angle, and includes a first outer edge in a tire axial direction located on the first tread edge side and a second outer edge in the tire axial direction located on the second tread edge side,
the first outer region is defined on the first tread edge side of the first outer edge of the central region,
the ground contact surface is provided with a plurality of oblique grooves each including a portion inclined with respect to a tire circumferential direction,
each of the oblique grooves extends across the central region and the first outer region,
each of the oblique grooves includes a vertical groove portion extending at an angle of 20 degrees or less with respect to the tire circumferential direction,
at least a part of the vertical groove portion is located in the central region,
a minimum distance in the tire axial direction along the ground contact surface between the vertical groove portion and the first outer edge of the central region is 30% or less of a maximum width in the tire axial direction of the central region along the ground contact surface,
in each of the oblique grooves, the vertical groove portion has a length of 10% or more and 20% or less of a total length of the each of the oblique grooves,
the oblique grooves are spaced apart from each other and each not connected with the first tread edge, a tire equator, and other grooves or sipes,
each of the oblique grooves is inclined to one side with respect to the tire circumferential direction from one end to the other end thereof in the tire circumferential direction except the vertical groove portion thereof,
the vertical groove portions are inclined to the one side or extend in parallel with the tire circumferential direction, and
each of the oblique grooves includes an inner groove portion arranged axially inside the vertical groove portion,
the inner groove portion has a maximum angle larger than the angle of the vertical groove portion with respect to the tire circumferential direction,
the oblique grooves include first oblique grooves and second oblique grooves,
the angle of the vertical groove portion of each of the first oblique grooves is less than 5 degrees,
the angle of the vertical groove portion of each of the second oblique grooves is 5 degrees or more, and
the number of the first oblique grooves is greater than the number of the second oblique grooves over an entire circumference of the motorcycle tire.

2. The motorcycle tire according to claim 1, wherein each of the oblique grooves includes at least one bent portion.

3. The motorcycle tire according to claim 1, wherein each of the oblique grooves includes a plurality of bent portions.

4. The motorcycle tire according to claim 1, wherein the vertical groove portion extends linearly.

5. The motorcycle tire according to claim 1, wherein the inner groove portion extends linearly.

6. The motorcycle tire according to claim 1, wherein the inner groove portion has a length of 20% or more and 50% or less of the total length of the each of the oblique grooves.

7. The motorcycle tire according to claim 1, wherein the vertical groove portions are arranged at different positions from each other in the tire axial direction in a pair of the oblique grooves adjacent to each other in the tire circumferential direction among the plurality of the oblique grooves.

8. The motorcycle tire according to claim 1, wherein a maximum groove width (W2) of the vertical groove portion is 50% or more of a maximum groove width of the each of the oblique grooves.

9. The motorcycle tire according to claim 1, wherein each of the oblique grooves includes an outer groove portion arranged axially outside the vertical groove portion, and the outer groove portion extends linearly.

10. The motorcycle tire according to claim 1, wherein each of the oblique grooves includes an outer groove portion arranged axially outside the vertical groove portion, and the outer groove portion extends in a zigzag shape.

11. The motorcycle tire according to claim 1, wherein
the motorcycle tire is bound with an intended tire rotational direction,
each of the oblique grooves includes a pair of groove edges, and
in the pair of the groove edges, the groove edge on a toe side in the tire rotational direction is formed with a chamfered portion.

12. The motorcycle tire according to claim 11, wherein the groove edge on a heel side in the tire rotational direction of the pair of the groove edges is not formed with the chamfered portion.

13. The motorcycle tire according to claim 1, wherein a distance in the tire axial direction from the first tread edge to the second tread edge is a maximum width of the tire.

14. The motorcycle tire according to claim 1, wherein
a distance (L2) in the tire axial direction along the ground contact surface from the tire equator to an axially inner end of each of the oblique grooves is 10% or less of a tread ground contacting width,
a distance (L3) in the tire axial direction along the ground contact surface from the first tread edge to an axially outer end of each of the oblique grooves is 10% or less of the tread ground contacting width, and
the tread ground contacting width is a distance along the ground contact surface from the first tread edge to the second tread edge.

15. The motorcycle tire according to claim 1, wherein in at least one pair of the oblique grooves adjacent to each other in the tire circumferential direction, axially inner ends thereof are arranged at different positions in the tire axial direction from each other, and axially outer ends thereof are arranged at different positions in the tire axial direction from each other.

16. A motorcycle tire comprising a tread portion, wherein
the tread portion includes a first tread edge, a second tread edge, and a ground contact surface defined between the first tread edge and the second tread edge,
the ground contact surface is curved in an arc shape so as to be convex outward in a tire radial direction,
the ground contact surface includes a central region and a first outer region,
the central region is configured to contact a ground during straight running with zero camber angle, and includes a first outer edge in a tire axial direction located on the first tread edge side and a second outer edge in the tire axial direction located on the second tread edge side,
the first outer region is defined on the first tread edge side of the first outer edge of the central region,
the ground contact surface is provided with a plurality of oblique grooves each including a portion inclined with respect to a tire circumferential direction,
each of the oblique grooves extends across the central region and the first outer region,
each of the oblique grooves includes a vertical groove portion extending at an angle of 20 degrees or less with respect to the tire circumferential direction,
at least a part of the vertical groove portion is located in the central region,
a minimum distance in the tire axial direction along the ground contact surface between the vertical groove portion and the first outer edge of the central region is 30% or less of a maximum width in the tire axial direction of the central region along the ground contact surface,
in each of the oblique grooves, the vertical groove portion has a length of 10% or more and 20% or less of a total length of the each of the oblique grooves,
the oblique grooves are spaced apart from each other and each not connected with the first tread edge, a tire equator, and other grooves or sipes,
each of the oblique grooves is inclined to one side with respect to the tire circumferential direction from one end to the other end thereof in the tire circumferential direction except the vertical groove portion thereof,
the vertical groove portions are inclined to the one side or extend in parallel with the tire circumferential direction, and
each of the oblique grooves includes an inner groove portion arranged axially inside the vertical groove portion and an outer groove portion arranged axially outside the vertical groove portion,
the inner groove portion has a maximum angle larger than the angle of the vertical groove portion with respect to the tire circumferential direction, [and]
the outer groove portion has a maximum angle larger than the angle of the vertical groove portion with respect to the tire circumferential direction, and
the inner groove portion extends linearly over an entire length thereof and includes an axially innermost end of the each of the oblique grooves.

17. The motorcycle tire according to claim 16, wherein the maximum angle of the inner groove portion is from 30 to 45 degrees.

* * * * *